(12) United States Patent
Nishino et al.

(10) Patent No.: US 9,554,003 B2
(45) Date of Patent: Jan. 24, 2017

(54) MANAGEMENT SERVER AND IMAGE FORMING SYSTEM INCLUDING THE SAME

(71) Applicant: KYOCERA Document Solutions Inc., Osaka (JP)

(72) Inventors: Tetsuya Nishino, Osaka (JP); Keiko Morita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/001,858

(22) Filed: Jan. 20, 2016

(65) Prior Publication Data

US 2016/0219166 A1    Jul. 28, 2016

(30) Foreign Application Priority Data

Jan. 26, 2015   (JP) ................................. 2015-012442
Jan. 26, 2015   (JP) ................................. 2015-012450

(51) Int. Cl.

| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *H04N 1/44* | (2006.01) | |

(52) U.S. Cl.
CPC ........ *H04N 1/00344* (2013.01); *G06F 3/1222* (2013.01); *G06F 3/1238* (2013.01); *G06F 3/1273* (2013.01); *G06F 3/1288* (2013.01); *H04N 1/4413* (2013.01); *H04N 2201/0094* (2013.01)

(58) Field of Classification Search
CPC .............. H04N 1/00344; H04N 1/4413; H04N 2201/0094; G06F 3/1222; G06F 3/1238; G06F 3/1273; G06F 3/1288
USPC ............................... 358/1.1, 1.15, 1.14, 1.13
See application file for complete search history.

(56) References Cited

U.S. PATENT DOCUMENTS

2004/0075860 A1   4/2004  Shima .......................... 358/1.15
2004/0130743 A1   7/2004  Nozato ......................... 358/1.14
(Continued)

FOREIGN PATENT DOCUMENTS

| JP | 2004-21646 A | 1/2004 |
|---|---|---|
| JP | 2004-178249 A | 6/2004 |

(Continued)

OTHER PUBLICATIONS

Japanese Office Action dated Jun. 22, 2016, issued by the Japanese Patent Office in corresponding application JP 2015-012442.

*Primary Examiner* — Douglas Tran
(74) *Attorney, Agent, or Firm* — Stein IP, LLC

(57) ABSTRACT

A management server includes a communication unit configured to receive job data and transmit the job data to the image forming apparatus so that the image forming apparatus executes the job, and a registering unit. When the communication unit receives the job data containing account information, if it is determined that the account information contained in the job data satisfies the registration condition, the registering unit registers the account information contained in the job data. If it is determined that the registration condition is not satisfied, the registering unit does not register the account information contained in the job data.

16 Claims, 13 Drawing Sheets

(56) References Cited

U.S. PATENT DOCUMENTS

| | | | | |
|---|---|---|---|---|
| 2009/0276847 A1* | 11/2009 | Kotaka | ................ | G06F 21/608 |
| | | | | 726/17 |
| 2012/0218609 A1* | 8/2012 | Kota | .................... | G06F 3/1222 |
| | | | | 358/3.28 |
| 2014/0078542 A1 | 3/2014 | Murayama | ................... | 358/1.14 |

FOREIGN PATENT DOCUMENTS

| | | | |
|---|---|---|---|
| JP | 2008-40796 | A | 2/2008 |
| JP | 2008-140067 | A | 6/2008 |
| JP | 2012-178115 | A | 9/2012 |
| JP | 2014-59630 | A | 4/2014 |

* cited by examiner

FIG.8

| | USER NAME | JOB | USER TYPE | JOB EXECUTION DATE | VALID PERIOD |
|---|---|---|---|---|---|
| 1 | USER A | PRINTER | FIXED TERM EMPLOYEE | 2014/3/1 | 2014/3/1~2014/3/8 |
| 2 | USER B | PRINTER | REGULAR EMPLOYEE | 2014/3/1 | 2014/3/1~2014/9/1 |
| 3 | USER A | COPY | - | 2014/3/3 | 2014/3/3~2014/3/10 |
| 4 | USER B | COPY | REGULAR EMPLOYEE | 2014/3/3 | 2014/3/3~2014/9/3 |
| ... | ... | ... | ... | ... | ... |

MANAGEMENT SERVER AND IMAGE FORMING SYSTEM INCLUDING THE SAME

INCORPORATION BY REFERENCE

This application is based upon and claims the benefit of priority from the corresponding Japanese Patent Applications No. 2015-012442 and No. 2015-012450 filed Jan. 26, 2015, and the entire contents of which are hereby incorporated by reference.

BACKGROUND

The present disclosure relates to a management server for managing account information and an image forming system including the management server.

Conventionally, there is known an image forming system including a management server for managing account information. For instance, the conventional image forming system includes a general-purpose certificate server as the management server. In addition, the image forming system includes an intermediate certificate server, a personal computer, an image forming apparatus, and the like. Further, the devices in the image forming system are connected so as to communicate with each other.

When the image forming apparatus is used as a printer, a user who uses the image forming apparatus inputs user information of the user (a user ID and a password) to the personal computer. The user information input to the personal computer is transmitted from the personal computer to the management server via the intermediate certificate server.

When receiving the user information, the management server checks whether or not the user information is correct information on the basis of a user account database. A result of the checking is transmitted to the intermediate certificate server. Further, if the user information is correct, the intermediate certificate server allows the user who has input the user information to use the image forming apparatus. In this way, it is possible to suppress unauthorized use of the image forming apparatus by a user who is not allowed to use the image forming apparatus.

SUMMARY

A management server according to a first aspect of the present disclosure includes a communication unit and a registering unit. The communication unit receives job data generated by the terminal device on the basis of installed driver software from a terminal device, and transmits the job data to an image forming apparatus, so as to cause the image forming apparatus to perform a job based on the job data. The registering unit registers account information of a user who uses the image forming apparatus. Further, when the communication unit receives the job data containing the account information, the registering unit determines whether or not the account information contained in the job data satisfies a predetermined registration condition, and registers the account information contained in the job data when determining that the account information contained in the job data satisfies the registration condition, and does not register the account information contained in the job data when determining that the account information contained in the job data does not satisfy the registration condition.

An image forming system according to a second aspect of the present disclosure includes the management server described above, an image forming apparatus, and a terminal device. The image forming apparatus is connected to the management server in a communicable manner. The terminal device transmits job data for allowing the image forming apparatus to perform a job to the management server.

BRIEF DESCRIPTION OF THE DRAWINGS

FIG. 8 is a diagram illustrating a start date and an end date of a valid period of the account information set by the management server according to an embodiment of the present invention (a diagram illustrating an example of a job execution history).

DETAILED DESCRIPTION

<Outline of Image Forming System>

Figure 1:
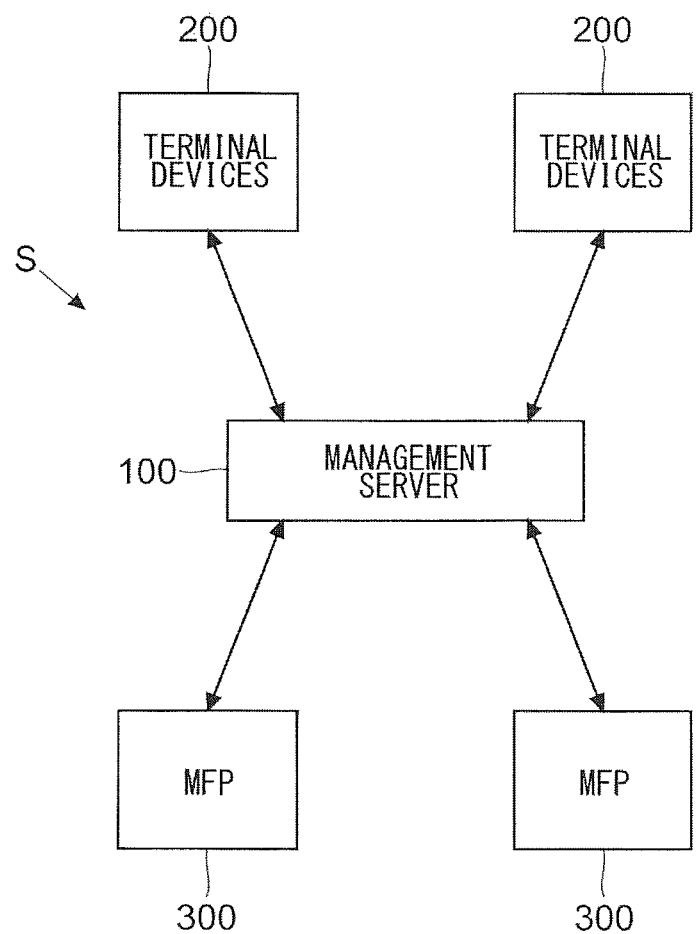
FIG. 1 is a schematic diagram of an image forming system according to an embodiment of the present invention.

As illustrated in FIG. 1, an image forming system S of this embodiment includes a management server 100, a terminal device 200, and a multifunction peripheral 300. The management server 100, the terminal device 200, and the multifunction peripheral 300 are connected in a communicable manner with each other via a communication network, so as to communicate various data. The terminal device 200 is a personal computer to be used by a user. The multifunction peripheral 300 has a plurality of functions such as a printer function, a copy function, and a facsimile function, and corresponds to an "image forming apparatus".

Note that the number of the terminal devices 200 and the number of the multifunction peripherals 300 disposed in the image forming system S are not particularly limited. In addition, a type of the image forming apparatus disposed in the image forming system S is not also particularly limited. For instance, it is possible to dispose a printer device instead of the multifunction peripheral 300 in the image forming system S. Alternatively, the multifunction peripheral 300 and an image forming apparatus (such as a printer device) other than the multifunction peripheral 300 may be disposed in a mixed manner in the image forming system S.

In this image forming system S, job data of a job (such as a print job) to be executed by the multifunction peripheral 300 is generated by the terminal device 200, and job execution based on the job data is instructed. Then, the job data is transmitted from the terminal device 200 to the management server 100. The management server 100 receives the job data from the terminal device 200 and checks various information contained in the job data.

For instance, if the job to be performed by the multifunction peripheral 300 is the print job, the job data thereof contains image data of an image to be printed, information indicating a user who has logged in the terminal device 200 as a transmission source of the job data, information indicating the multifunction peripheral 300 selected as a job executor, and information indicating job execution conditions (i.e., setting values of various setting items such as the number of print copies, a paper sheet size, one sided or double sided printing, aggregate printing, print density, and print scale).

After checking various information contained in the job data, the management server 100 transmits the job data to the multifunction peripheral 300 selected as the job executor so as to allow the multifunction peripheral 300 to execute the job. In addition, the management server 100 stores an execution history of jobs executed on the basis of the job data (i.e., a job execution history) and updates the job execution history when the multifunction peripheral 300 executes the job.

<Structure of Devices Included in Image Forming System>

Figure 2:
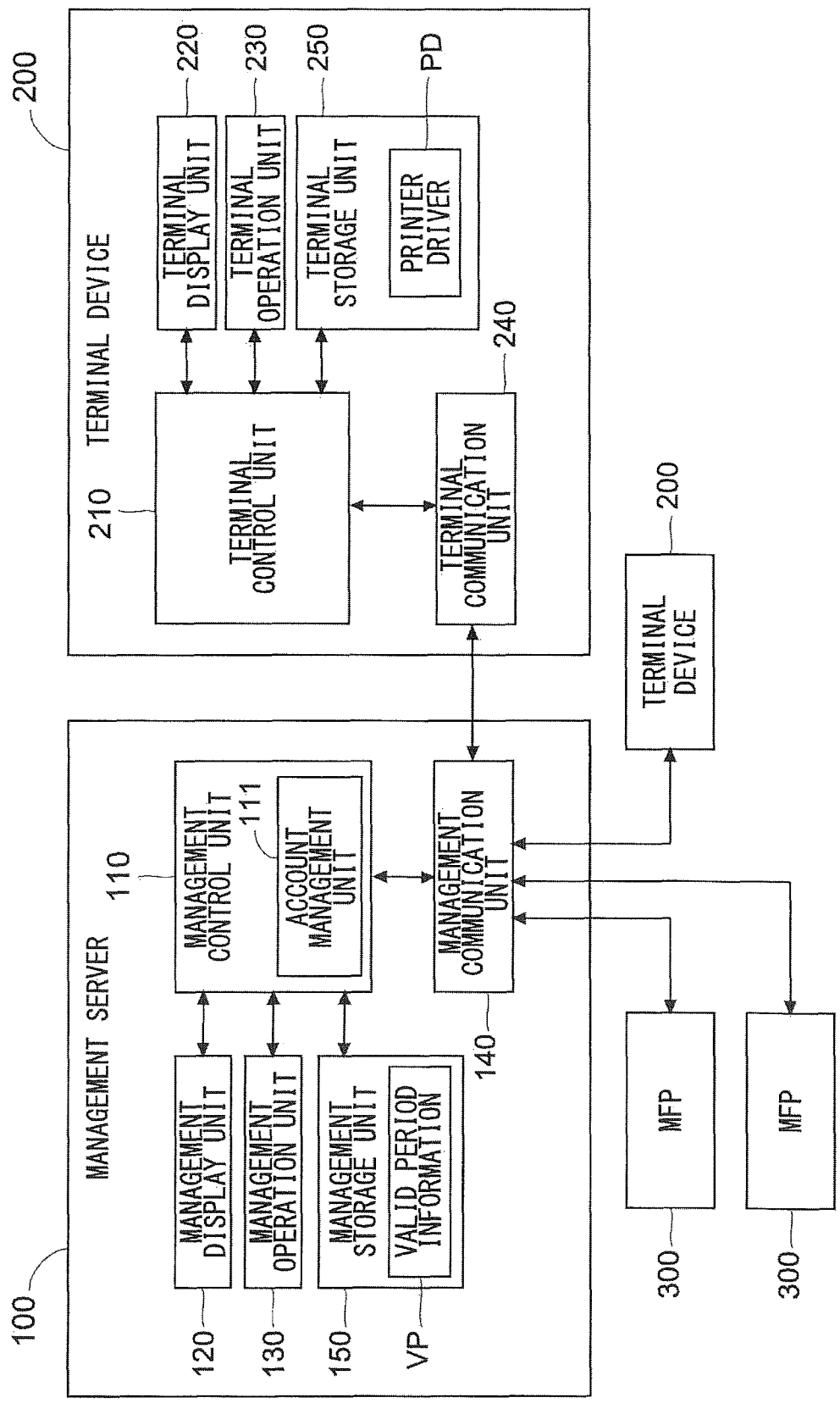
FIG. 2 is a diagram illustrating hardware structures of a management server and a terminal device included in the image forming system according to an embodiment of the present invention.

As illustrated in FIG. 2, the management server 100 includes a management control unit 110, a management display unit 120, a management operation unit 130, a management communication unit 140, and a management storage unit 150. Further, the management control unit 110 corresponds to a "registering unit", the management operation unit 130 corresponds to a "receiving unit", and the management communication unit 140 corresponds to a "communication unit".

The management control unit 110 includes a processor such as a CPU and performs the entire control of the management server 100. The management display unit 120 is a display device (such as an LCD) connected to a server main body, for example, and displays various screens. The management operation unit 130 is an input device (hardware keyboard) connected to the server main body, for example, and receives various settings.

The management communication unit 140 is connected to the communication network and performs various communications such as the Internet communication. For instance, the management communication unit 140 transmits and receives various data between the terminal device 200 and the multifunction peripheral 300. The management storage unit 150 includes a memory and stores a program and data for controlling the management server 100.

The terminal device 200 includes a terminal control unit 210, a terminal display unit 220, a terminal operation unit 230, a terminal communication unit 240, and a terminal storage unit 250.

The terminal control unit 210 performs the entire control of the terminal device 200. The terminal display unit 200 is a display such as an LCD and displays various screens. The terminal operation unit 230 is a hardware keyboard and receives various settings. The terminal communication unit 240 is connected to the communication network so as to communicate various data with the management server 100. In addition, the terminal communication unit 240 makes access to the Internet via the communication network. The terminal storage unit 250 stores a program and data for controlling the terminal device 200.

In addition, the terminal storage unit 250 stores a printer driver PD installed in the terminal device 200. The printer driver PD is software necessary for using the printer function of the multifunction peripheral 300 and is software for generating job data for the multifunction peripheral 300 to execute the print job.

Figure 3:
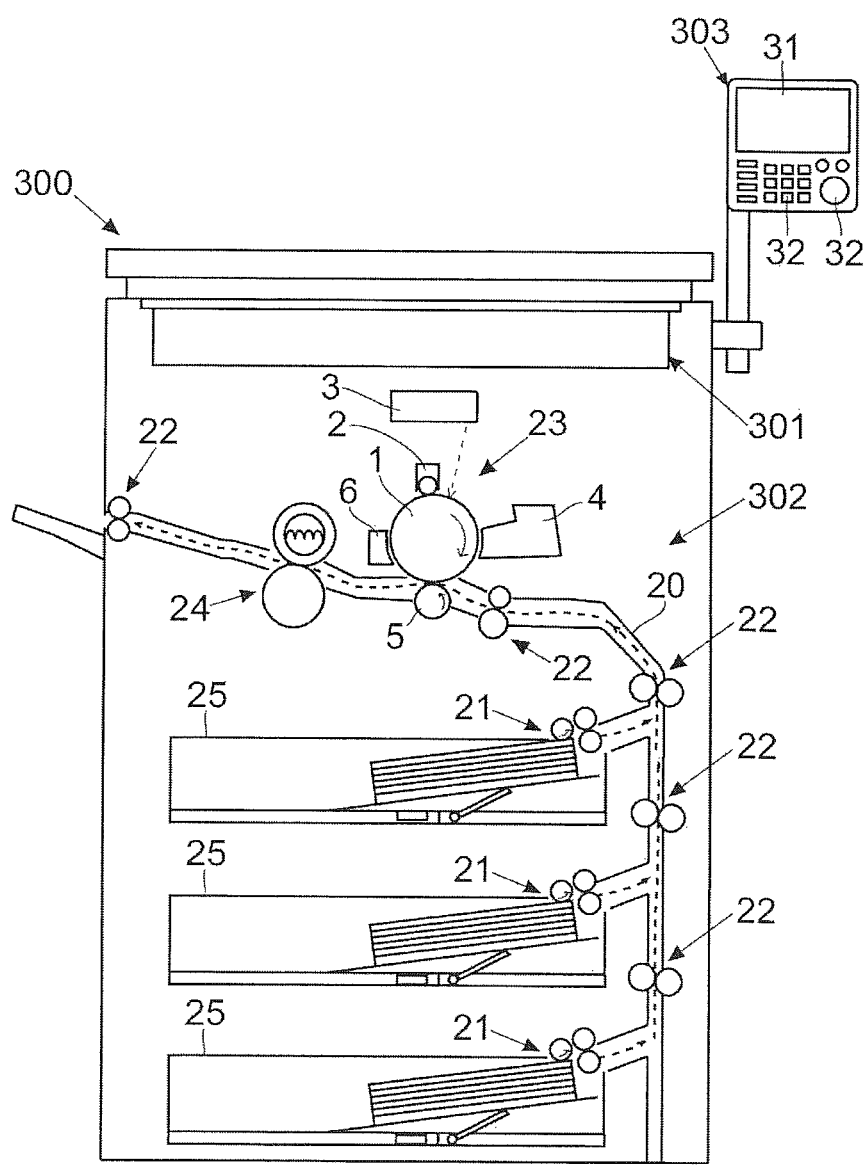
FIG. 3 is a diagram illustrating an example of a structure of a multifunction peripheral included in the image forming system according to an embodiment of the present invention.

As illustrated in FIG. 3, the multifunction peripheral 300 includes an image reading unit 301, a printing unit 302, and an operation panel 303.

The image reading unit 301 reads a document so as to generate image data of the document. For instance, the image data of the document obtained by reading by the image reading unit 301 becomes fundamental data of the image to be printed by the printing unit 302.

The printing unit 302 is constituted of a paper sheet feeder 21, a sheet conveying unit 22, an image forming unit 23, and a fixing unit 24. The paper sheet feeder 21 feeds a paper sheet stored in a paper sheet cassette 25 to a sheet conveying path 20. The sheet conveying unit 22 conveys the paper sheet along the sheet conveying path 20. The image forming unit 23 includes a photosensitive drum 1, a charging unit 2, an exposing unit 3, a developing unit 4, a transfer roller 5, and a cleaning unit 6. Further, the image forming unit 23 forms a toner image based on the image data and transfers the toner image onto the paper sheet. The fixing unit 24 heats and presses the toner image transferred onto the paper sheet so that the toner image is fixed.

The operation panel 303 includes a display panel 31 equipped with a touch panel. The display panel 31 displays software keys and messages for receiving various settings and the like. In addition, hardware keys 32 such as a start key and a ten-key are disposed in the operation panel 303.

Registration of Account Information

As illustrated in FIG. 2, the management control unit 110 of the management server 100 includes an account management unit 111. Further, the management control unit 110

(account management unit 111) performs registration and management of account information of a user who uses the multifunction peripheral 300. For instance, the account information is a user ID (user name) and a password. However, information other than the user ID and the password can be added to the account information. For instance, department name information indicating a department name of a department to which the user belongs may be added to the account information. Alternatively, type information indicating a type of the user (e.g., a type of employment such as a regular employee, a contract employee, a senior employee, and a fixed term employee) may be added to the account information. Further, a function of performing registration and management of the account information may be separated from the management server 100, and a dedicated server for performing registration and management of the account information may be disposed in the image forming system S.

If the account information is not registered in the management server 100, a user cannot log in the multifunction peripheral 300. In this case, use of the functions of the multifunction peripheral 300 is partially restricted (or use of all the functions of the multifunction peripheral 300 may be restricted). Accordingly, in order to use a function whose use is restricted in the multifunction peripheral 300, it is necessary to register the account information in the management server 100 and to log in the multifunction peripheral 300. Note that a function whose use is restricted (a function that can be used only by a logged-in user) is not particularly limited.

Then, a screen for inputting account information is displayed on the management display unit 120, and the account information is input by using the management operation unit 130 (as manual input). Thus, the account information can be registered in the management server 100. For instance, the registration of the account information is performed by the account manager (who manages the management server 100). However, if there are many users who use the multifunction peripheral 300 in the image forming system S, manual input of the account information of users takes a lot of time and effort (there is much load on the account manager).

Accordingly, in this embodiment, the job data transmitted from the terminal device 200 to the management server 100 contains account information to be registered, and hence the account information contained in the job data is registered in the management server 100. However, the management server 100 registers the account information contained in the job data only if the account information contained in the job data is the account information satisfying a predetermined registration condition. In other words, even if the job data includes the account information, if the registration condition is not satisfied, the management server 100 does not register the account information contained in the job data.

Hereinafter, with reference to FIGS. 4 to 6, a registration process of the account information is described in detail. Note that the job data containing the account information may be referred to as registering job data in the following description.

(First Registration Method)

Figure 4:
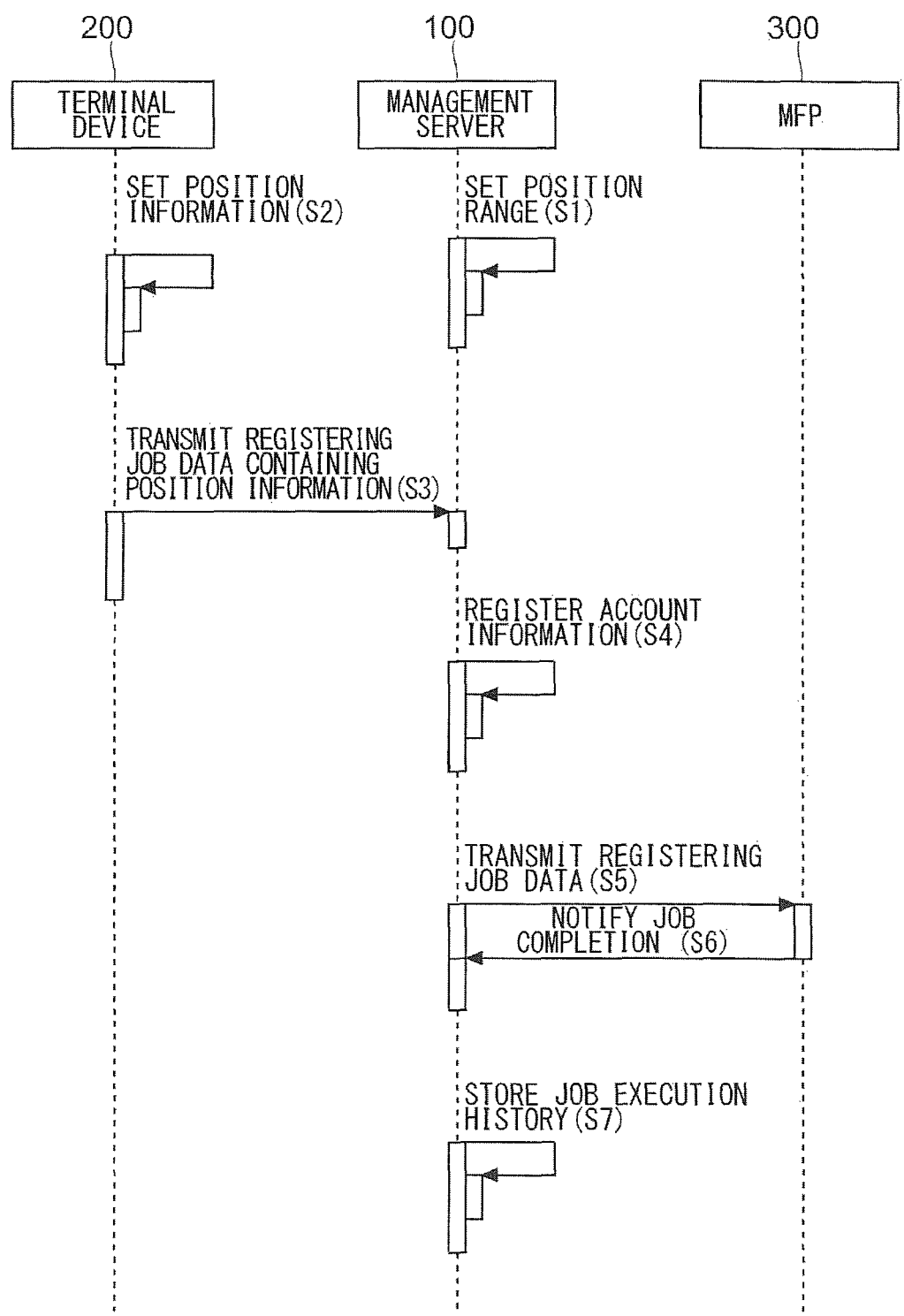
FIG. 4 is a sequence diagram for explaining a registration process (first registration method) of account information performed by the management server according to an embodiment of the present invention.

As illustrated in FIG. 4, in the first registration method, as a preparation work on the management server 100 side, a position range of a location of the terminal device 200 that can be a registration receiving target of the account information is set in advance (S1). In this case, the account manager operates the management server 100 (management operation unit 130) so as to set coordinates defining the position range. For instance, a range of the entire floor of an office in which the image forming system S is installed is the position range. Further, the account manager also sets a registration receiving period (start date and time and end date and time) of the account information in advance. Information pieces respectively indicating the position range and the registration receiving period set here are stored in the management storage unit 150. Note that the start date and time and the end date and time of the registration receiving period are notified to a target user from the account manager in advance (in other words, they are notified via electronic mail or the like in advance).

On the terminal device 200 side, for registration of the account information, the user who wants to register the account information sets position information indicating a location of the terminal device 200 (S2). When receiving an instruction to set the position information, the terminal control unit 210 instructs the terminal communication unit 240 to make access to a map information providing server on the Internet. In this way, the terminal control unit 210 obtains coordinates of a present location. Further, the terminal control unit 210 sets the coordinates of the present location obtained via the Internet as the position information indicating own location and controls the terminal storage unit 250 to store the position information. Further, the terminal control unit 210 controls the terminal storage unit 250 to store date and time information indicating the date and time when the position information is set, in association with the position information.

In addition, on the terminal device 200 side, for registration of the account information, the user who wants to register the account information inputs the account information to be registered. In this case, the printer driver PD becomes an activated state (a state in which the terminal control unit 210 can operate on the basis of the printer driver PD). Further, the terminal control unit 210 controls the terminal display unit 220 to display an account input screen (not illustrated) for receiving the input of the account information and controls the terminal operation unit 230 to receive the input of the account information. In addition, when information is input to the account input screen, the terminal control unit 210 sets the information as the account information and controls the terminal storage unit 250 to store the account information. Note that the receiving process of the input of the account information is performed on the basis of the printer driver PD. In other words, the printer driver PD allows the terminal device 200 (terminal control unit 210) to perform the receiving process of the input of the account information.

Further, the terminal control unit 210 generates the registering job data containing the account information, the position information, and the date and time information. In this case, the image data of the image to be printed is also contained in the registering job data. However, the image data of the image to be printed may not be contained in the registering job data. In other words, it is possible to generate the registering job data aimed only at registration of the account information. Note that the generating process of the registering job data is performed on the basis of the printer driver PD. In other words, the printer driver PD allows the terminal device 200 (terminal control unit 210) to perform the generating process of the registering job data.

After that, the user who wants to register the account information performs an operation for transmitting the registering job data to the management server 100 with the terminal device 200 (terminal operation unit 230). When receiving this operation, the terminal control unit 210 instructs the terminal communication unit 240 to transmit the registering job data to the management server 100 (S3). The registering job data transmitted to the management server 100 contains the account information, the position information, and date and the time information. Note that the transmitting process of the registering job data to the management server 100 is performed on the basis of the printer driver PD. In other words, the printer driver PD allows the terminal device 200 (terminal control unit 210) to perform the transmitting process of the registering job data to the management server 100.

In the management server 100, the management communication unit 140 receives the registering job data from the terminal device 200. When the management communication unit 140 receives the registering job data, the management control unit 110 determines whether or not the account information contained in the registering job data satisfies the registration condition. Further, if the account information contained in the registering job data satisfies the registration condition, the management control unit 110 registers the account information contained in the registering job data (S4).

Specifically, the management control unit 110 extracts the position information (indicating the location of the terminal device 200 as a transmission source of the registering job) and the date and time information (indicating the date and time when the position information is set) from the registering job data. Further, if the location of the terminal device 200 indicated by the position information is within a predetermined position range and if the position information is set in a predetermined registration receiving period (if the date and time when the position information is set indicated by the date and time information is date and time within the predetermined registration receiving period), the management control unit 110 determines that the account information contained in the registering job data satisfies the registration condition. In other words, in this case, the management control unit 110 registers the account information contained in the registering job data (controls the management storage unit 150 to store the account information).

On the other hand, if at least one of the position information and the date and time information is not contained in the registering job data, the management control unit 110 determines that the account information contained in the registering job data does not satisfy the registration condition. In addition, even if the registering job data contains the position information, if the location of the terminal device 200 indicated by the position information is outside the predetermined position range, the management control unit 110 determines that the account information contained in the registering job data does not satisfy the registration condition. Further, even if the registering job data contains the date and time information, if the position information is set outside the predetermined registration receiving period (if the date and time when the position information is set indicated by the date and time information is outside the predetermined registration receiving period), the management control unit 110 determines that the account information contained in the registering job data does not satisfy the registration condition. Further, in these cases, the management control unit 110 does not register the account information contained in the registering job data.

Further, as a variation, if the registering job data contains the position information and if the location of the terminal device 200 indicated by the position information is within the predetermined position range, regardless of whether or not the registering job data contains the date and time information (whether or not the date and time when the position information is set indicated by the date and time information is within the predetermined registration receiving period), it is possible to register the account information contained in the registering job data. In this case, it is not necessary that the registering job data contains the date and time information.

After registering the account information contained in the registering job data, the management control unit 110 instructs the management communication unit 140 to transmit the registering job data to the multifunction peripheral 300 (S5). In other words, the management control unit 110 controls the multifunction peripheral 300 to perform the job based on the registering job data. When the job based on the registering job data is completed, the multifunction peripheral 300 transmits a job completion notice to the management server 100 (S6).

In the management server 100, the management communication unit 140 receives the job completion notice transmitted from the multifunction peripheral 300. When the management communication unit 140 receives the job completion notice, the management control unit 110 controls the management storage unit 150 to store the job execution history (S7). In this case, the management storage unit 150 stores the information in which the account information is associated with information about the job executed on the basis of the registering job data (a job name and job execution date) as the job execution history. In other words, the job execution history is information containing registered account information.

Note that the management server 100 receives an output instruction (e.g., a print instruction) of the job execution history as the information containing the registered account information. When receiving the instruction to output the job execution history, the management control unit 110 controls the management display unit 120 to display a screen for receiving the instruction to output the job execution history. Further, when the management operation unit 130 receives the print instruction of the job execution history, the management control unit 110 instructs the management communication unit 140 to transmit to the multifunction peripheral 300 the job data containing a command to output the job execution history.

When receiving the job data containing the command to output the job execution history, the multifunction peripheral 300 outputs the job execution history. In other words, the multifunction peripheral 300 outputs the information containing the registered account information. For instance, when print output of the job execution history is performed, the printed matter has information about the job executed on the basis of the registering job data (the job name and the job execution date) and the account information corresponding to the job. Accordingly, the user who has registered the account information can perform checking work on the paper. Note that the job execution history is not limited to printing, and it is possible to display on the operation panel 303. Alternatively, it is possible to display on the management display unit 120 of the management server 100 or to display on the terminal display unit 220 of the terminal device 200.

(Second Registration Method)

Figure 5:
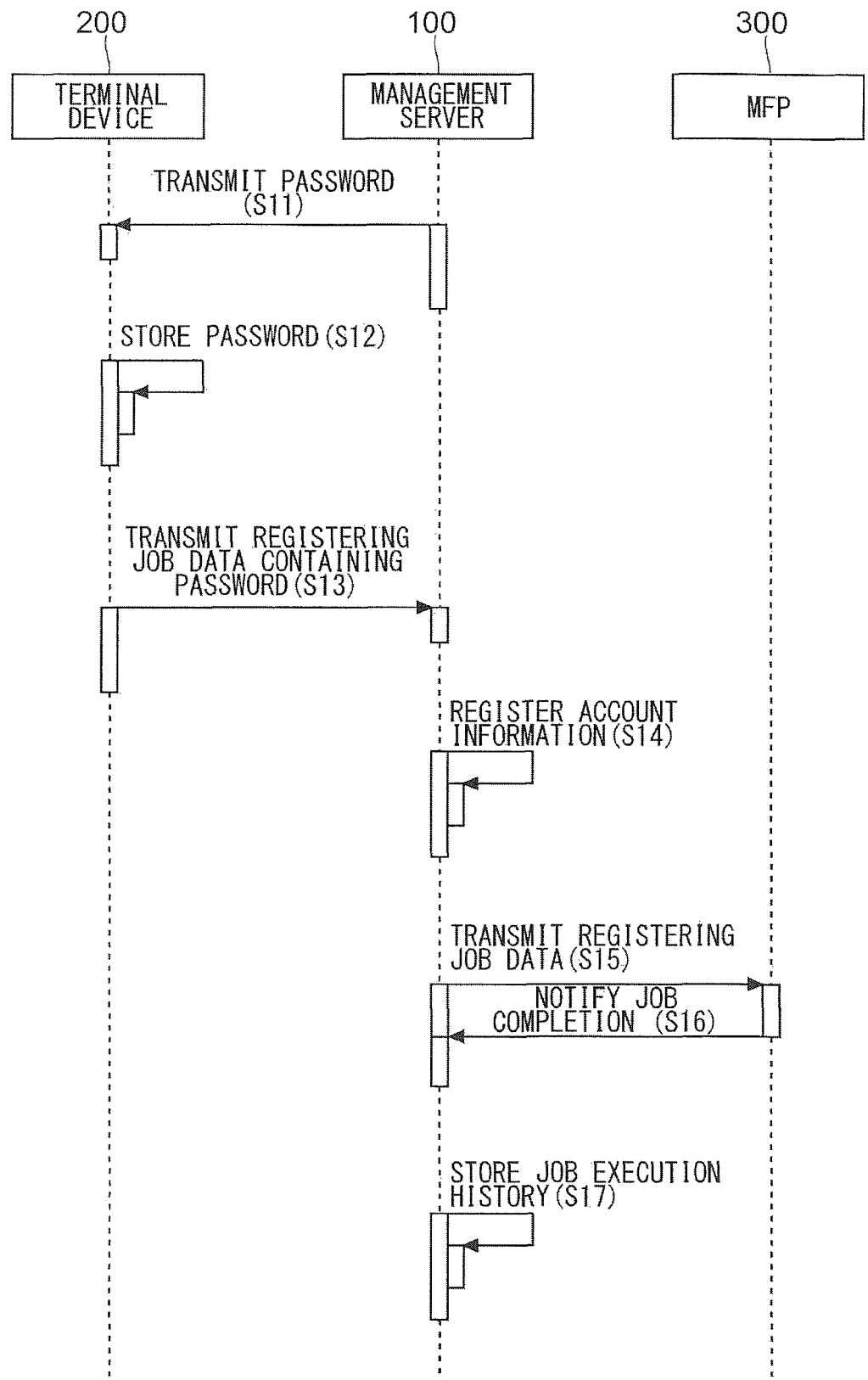
FIG. 5 is a sequence diagram for explaining a registration process (second registration method) of the account information performed by the management server according to an embodiment of the present invention.

As illustrated in FIG. 5, in a second registration method, as a preparation work on the management server 100 side, a password is generated. For instance, this password may be a time-limited password with a valid time limit. Note that the valid time limit may not be set to the password. Further, the management control unit 110 instructs the management communication unit 140 to transmit the password generated therein to the terminal device 200 in advance (S11).

In the terminal device 200, the terminal communication unit 240 receives the password transmitted from the management server 100. When the terminal communication unit 240 receives the password, the terminal control unit 210 controls the terminal storage unit 250 to automatically store the password (S12). Alternatively, when the terminal communication unit 240 receives the password, the terminal control unit 210 controls the terminal display unit 220 to display a screen for receiving a selection instruction of whether or not to register the password. Further, when the terminal operation unit 230 receives an instruction to register the password, the management control unit 210 controls the terminal storage unit 250 to store the password.

In addition, on the terminal device 200 side, for registration of the account information, the user who wants to register the account information inputs the account information to be registered. When the account information is input, the terminal control unit 210 controls the terminal storage unit 250 to store the account information. Further, the terminal control unit 210 generates the registering job data containing the password obtained from the management server 100 in advance.

After that, the user who wants to register the account information performs an operation for transmitting the registering job data to the management server 100 with the terminal device 200 (terminal operation unit 230). When receiving this operation, the terminal control unit 210 instructs the terminal communication unit 240 to transmit the registering job data to the management server 100 (S13). In this case, the registering job data transmitted to the management server 100 contains the password obtained from the management server 100 in advance.

In the management server 100, the management communication unit 140 receives the registering job data from the terminal device 200. Further, if the same password as that transmitted to the terminal device 200 in advance is contained in the registering job data, the management control unit 110 determines that the account information contained in the registering job data satisfies the registration condition. In other words, in this case, the management control unit 110 registers the account information contained in the registering job data. Further, if a valid time limit is set to the password, the account information contained in the registering job data is registered on the condition that the same password as that transmitted to the terminal device 200 in advance is contained in the registering job data, and that the valid time limit of the password is not expired.

On the other hand, if the same password as that transmitted to the terminal device 200 in advance is not contained in the registering job data, the management control unit 110 determines that the account information contained in the registering job data does not satisfy the registration condition. In addition, in the case where a valid time limit is set to the password transmitted to the terminal device 200 in advance, if the valid time limit of the password is expired at time point when the management communication unit 140 receives the registering job data, even if the same password as that transmitted to the terminal device 200 in advance is contained in the registering job data, the management control unit 110 determines that the account information contained in the registering job data does not satisfy the registration condition. Further, in these cases, the management control unit 110 does not register the account information contained in the registering job data.

After the registration of the account information contained in the registering job data, the management control unit 110 instructs the management communication unit 140 to transmit the registering job data to the multifunction peripheral 300 (S15). After that, when the job based on the registering job data is completed, a job completion notice is transmitted from the multifunction peripheral 300 to the management server 100 (S16). Further, the management control unit 110 controls the management storage unit 150 to store the job execution history (S17).

(Third Registration Method)

Figure 6:
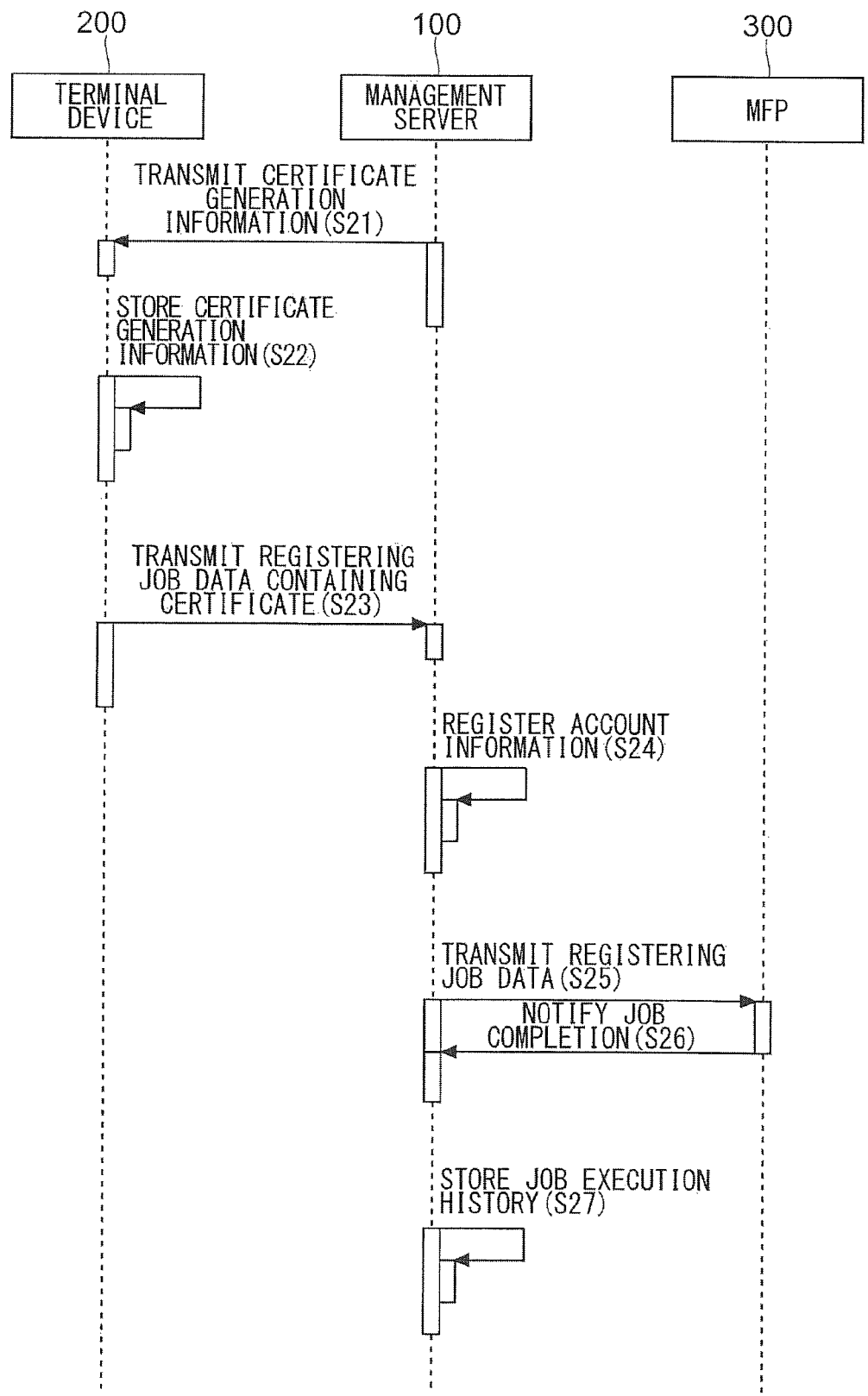
FIG. 6 is a sequence diagram for explaining a registration process (third registration method) of the account information performed by the management server according to an embodiment of the present invention.

As illustrated in FIG. 6, in a third registration method, an electronic certificate is generated as a preparation work on the management server 100 side. This electronic certificate contains a public key, owner information, certificate authority information, an issuance date, a valid time limit, an electronic certification of the certificate authority, and the like. Further, the management control unit 110 instructs the management communication unit 140 to transmit to terminal device 200 in advance information containing the electronic certificate generated therein and a private key (certificate generation information for the terminal device 200 to generate the electronic certificate) (S21). In this case, it is possible to set a password to the certificate generation information so that content of the electronic certificate information does not leak.

In the terminal device 200, the terminal communication unit 240 receives the certificate generation information transmitted from the management server 100. When the terminal communication unit 240 receives the certificate generation information, the terminal control unit 210 controls the terminal storage unit 250 to automatically store the certificate generation information (S22). Alternatively, if a password is set to the certificate generation information, the terminal control unit 210 controls the terminal display unit 220 to display a screen for receiving an input of the password. Further, the management control unit 210 decodes the certificate generation information by using the input password and controls the terminal storage unit 250 to store the certificate generation information. Further, if a password is set to the certificate generation information, it is necessary to obtain a password for decoding the certificate generation information from the management server 100 (account manager) in advance.

In addition, on the terminal device 200 side, for registration of the account information, the user who wants to register the account information inputs the account information to be registered. When the account information is input, the terminal control unit 210 controls the terminal storage unit 250 to store the account information. Further, the terminal control unit 210 generates the registering job data with signature data.

When generating the registering job data with the signature data, the terminal control unit 210 performs a hash operation on the registering job data with a hash function so as to derive a hash value and encrypts the hash value with the private key so as to generate the signature data. Note that the private key used for generating the signature data is contained in the certificate generation information. After generating the signature data, the terminal control unit 210 adds the signature data to the registering job data.

After that, the user who wants to register the account information performs an operation for transmitting the registering job data to the management server 100 with the terminal device 200 (terminal operation unit 230). When receiving this operation, the terminal control unit 210 instructs the terminal communication unit 240 to transmit the registering job data to the management server 100 (S23). In this case, the signature data is added to the registering job data transmitted to the management server 100. In addition, together with the registering job data with the signature data, the electronic certificate is also transmitted to the management server 100.

In the management server 100, the management communication unit 140 receives the registering job data (containing the signature data and the electronic certificate) from the terminal device 200. Further, the management control unit 110 checks whether or not the electronic certificate is valid.

When checking whether or not the electronic certificate is valid, the management control unit 110 performs a hash operation on the registering job data with a hash function so as to derive a hash value (hereinafter, the hash value derived here is referred to as a first hash value). In addition, the management control unit 110 extracts the public key from the electronic certificate and decodes the signature data by using the public key so as to derive a hash value (hereinafter, the hash value derived here is referred to as a second hash value). Further, the management control unit 110 compares the first hash value with the second hash value and determines that the electronic certificate is valid if the hash values are identical to each other. Further, if the signature data cannot be decoded normally, or if the first hash value is not identical to the second hash value, the management control unit 110 determines that the electronic certificate is invalid.

If the electronic certificate is valid, the management control unit 110 determines that the account information contained in the registering job data satisfies the registration condition and registers the account information contained in the registering job data (S24). On the contrary, if the electronic certificate is invalid, the management control unit 110 determines that the account information contained in the registering job data does not satisfy the registration condition and does not register the account information contained in the registering job data. In addition, the management control unit 110 determines that the registration condition is not satisfied (does not register the account information) for the registering job data without the signature data or the electronic certificate.

After the registration of the account information contained in the registering job data, the management control unit 110 instructs the management communication unit 140 to transmit the registering job data to the multifunction peripheral 300 (S25). After that, when the job based on the registering job data is completed, a job completion notice is transmitted from the multifunction peripheral 300 to the management server 100 (S26). Further, the management control unit 110 controls the management storage unit 150 to store the job execution history (S27).

The management server 100 uses one of the first to third registration methods so as determine whether or not the account information contained in the registering job data satisfies the registration condition. Note which one of the first to third registration methods should be used can be selected. For instance, the management control unit 110 controls the management display unit 120 to display a screen in which the first to third registration methods are arranged as options. Further, when the management operation unit 130 receives a selection instruction, the management control unit 110 controls the management storage unit 150 to store information indicating which one of the first to third registration methods is selected. Further, the management control unit 110 uses the selected one of the first to third registration methods so as to determine whether or not the account information contained in the registering job data satisfies the registration condition.

<Valid Period of Account Information>

(Setting of Start Date of Valid Period)

Figure 7:
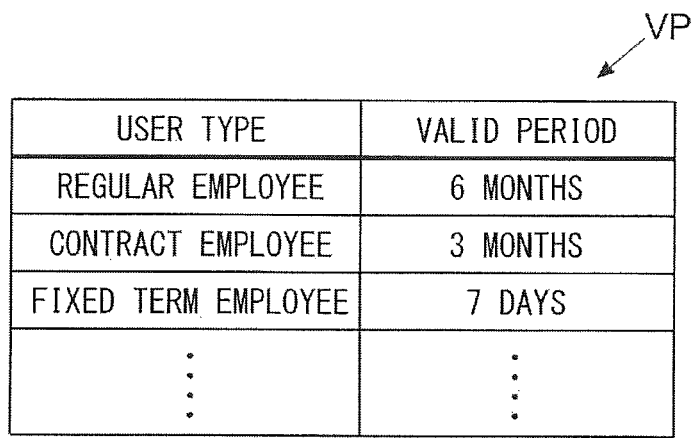
FIG. 7 is a diagram illustrating an example of valid period information stored in the management server according to an embodiment of the present invention.

The management storage unit 150 stores valid period information VP indicating a predetermined valid period as a period in which the account information can be used (see FIG. 2). This valid period information VP is information as illustrated in FIG. 7, in which the valid period of the account information is determined in advance for each type of the user (a type of employment of the user in the example illustrated in FIG. 7). In the example illustrated in FIG. 7, the valid period for a regular employee is 6 months, the valid period for a contract employee is 3 months, and the valid period for a fixed term employee is 7 days.

Further, after the account information is registered, the management control unit 110 sets a start date and an end date of the valid period of the registered account information on the basis of the valid period information VP. Hereinafter, with reference to FIG. 8, there is described a method of setting the start date (end date) of the valid period of the account information. In the following description, the account information registered by the management control unit 110 may be referred to as registered account information. Note that FIG. 8 illustrates a job execution history indicating a history of jobs executed by the multifunction peripheral 300.

For instance, it is supposed that the present date is Mar. 1, 2014, on which the management communication unit 140 receives the registering job data (printer job data for the multifunction peripheral 300 to execute printing) transmitted from the terminal device 200 that is used by user A as a fixed term employee. In addition, it is supposed that the account information contained in the registering job data from the user A satisfies the predetermined registration condition. In this case, the management control unit 110 registers the account information of the user A contained in the registering job data. Note that the registering job data from the user A is transmitted from the management server 100 to the multifunction peripheral 300. Further, the multifunction peripheral 300 executes the job based on the registering job data (printer job) from the user A.

In addition, the management control unit 110 recognizes that the type of the user A is the fixed term employee on the basis of the type information contained in the registered account information of the userA. Further, the management control unit 110 discriminates the valid period for the fixed term employee on the basis of the valid period information VP and sets the discriminated valid period as the valid period of the registered account information of the userA. Further, the management control unit 110 sets the start date of the valid period of the registered account information of the user A to be the registration date of the registered account information (execution date of the job based on the registering job data from the user A). Here, the valid period for the fixed term employee is 7 days (see FIG. 7). Accordingly, the valid period of the registered account information of the user A is from Mar. 1, 2014 to Mar. 8, 2014 (see record 1 in FIG. 8).

After that, when the end date of the valid period of the registered account information of the user A is passed, the management control unit 110 deletes the registered account information of the userA. In other words, when the present date is changed from March 8 to March 9, the registered account information of the user A is deleted.

As another example, it is supposed that the registering job data received from the management server 100 is from user B, and the user B is a regular employee. In this case, the valid period for the regular employee is 6 months (see FIG. 7), and therefore the valid period of the registered account information of the user B is from Mar. 1, 2014 to Sep. 1, 2014 (see record 2 in FIG. 8).

(Reset of Start Date of Valid Period)

When the management communication unit 140 receives job data containing the account information different from the registered account information, the management control unit 110 determines that the job data is the registering job data. In this case, if the account information contained in the registering job data satisfies the registration condition, the management control unit 110 registers the account information contained in the registering job data and sets the start date (end date) of the valid period of the registered account information. In addition, the management control unit 110 instructs the management communication unit 140 to transmit the registering job data to the multifunction peripheral 300 (so that the multifunction peripheral 300 executes the job based on the registering job data). Further, if the account information contained in the registering job data does not satisfy the registration condition, the management control unit 110 does not register the account information contained in the registering job data, and the registering job data is not transmitted to the multifunction peripheral 300.

On the other hand, if the management communication unit 140 receives the job data including the same account information as the registered account information (hereinafter may be referred to as a predetermined job data), the management control unit 110 instructs the management communication unit 140 to transmit the predetermined job data to the multifunction peripheral 300 (so that the multifunction peripheral 300 executes the job based on the predetermined job data). In this case, the management control unit 110 does not perform the registration process of the account information and resets the start date (end date) of the valid period of the registered account information. Specifically, when the job based on the predetermined job data is executed by the multifunction peripheral 300, the management control unit 110 resets the start date of the valid period of the registered account information corresponding to the account information contained in the predetermined job data to be the execution date of the job based on the predetermined job data.

For instance, it is supposed that the multifunction peripheral 300 has executed the job based on the predetermined job data including the same account information as the registered account information (valid period is from March 1 to September 1) of the user B (regular employee) illustrated in FIG. 8. In addition, it is supposed that the execution date of the job based on the predetermined job data is March 3. Further, it is supposed that the predetermined job data is printer job data.

Figure 9:
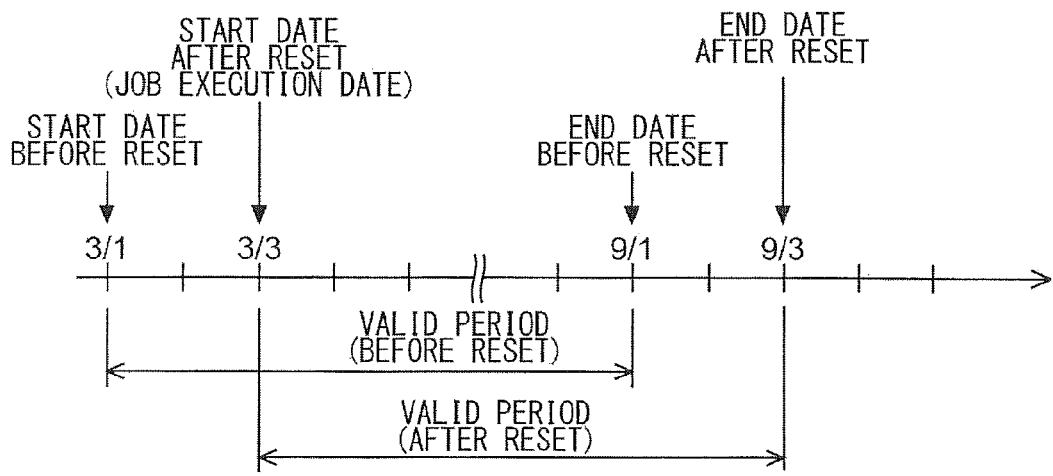
FIG. 9 is a diagram for explaining a process for setting the start date and the end date of the valid period of the account information performed by the management server according to an embodiment of the present invention.

In this case, as illustrated in FIG. 9, the start date of the valid period of the registered account information of the user B (before reset: March 1) is reset to be March 3, which is the execution date of the job based on the predetermined job data. Accordingly, the end date (before reset: September 1) of the valid period of the registered account information of the user B is reset to be September 3, which is the date 6 months after the start date after reset (see record 4 in FIG. 8).

Alternatively, when the multifunction peripheral 300 in the logged-in state after receiving the input of the same account information as the registered account information executes the job, the management control unit 110 resets the start date (end date) of the valid period of the registered account information.

Specifically, when the account information (e.g., the user name and the password) is input to the multifunction peripheral 300 for logging in the multifunction peripheral 300, the account information is transmitted from the multifunction peripheral 300 to the management server 100. Further, the management server 100 (management control unit 110) performs user certificate on the basis of the account information input to the multifunction peripheral 300.

When performing the user certificate, the management control unit 110 checks whether or not there is registered account information that is identical to the account information input to the multifunction peripheral 300. As a result, if there is registered account information that is identical to the account information input to the multifunction peripheral 300, the management control unit 110 determines that the account information input to the multifunction peripheral 300 is correct. In this case, the management control unit 110 instructs the management communication unit 140 to transmit to the multifunction peripheral 300 a log-in permission notice indicating permission to log in. In this way, the multifunction peripheral 300 becomes the logged-in state. In other words, the multifunction peripheral 300 becomes the logged-in state after receiving the input of the same account information as the registered account information.

After that, when the multifunction peripheral 300 in the logged-in state executes the job, the management control unit 110 resets the start date of the valid period of the registered account information corresponding to the account information input to the multifunction peripheral 300 in the logged-in state (the registered account information identical to the account information input to the multifunction peripheral 300 in the logged-in state) to be the execution date of the job.

For instance, it is supposed that the user A (fixed term employee) illustrated in FIG. 8 has logged in the multifunction peripheral 300. In other words, it is supposed that the same account information as the registered account information of the user A (having the valid period from March 1 to March 8) is input to the multifunction peripheral 300. Further, it is supposed that the multifunction peripheral 300 in the logged-in state has executed the copy job or the facsimile job (e.g., the copy job). Note that the execution date of the job is March 3.

In this case, the start date (before reset: March 1) of the valid period of the registered account information of the user A is reset to be March 3, which is the execution date of the job executed by the multifunction peripheral 300 in the logged-in state. Accordingly, the end date (before reset: March 8) of the valid period of the registered account information of the user A is reset to be March 10, which is 7 days after the start date after the resetting (see record 3 in FIG. 8). Further, when logging in the multifunction peripheral 300, it is not required to input type information indicating the type of the user. Accordingly, in this case, the type of the user A is not left in the history.

(Advance Notice Period)

Hereinafter, with reference to the flowchart illustrated in FIG. 10, a process flow of setting the advance notice period is described.

Figure 10:
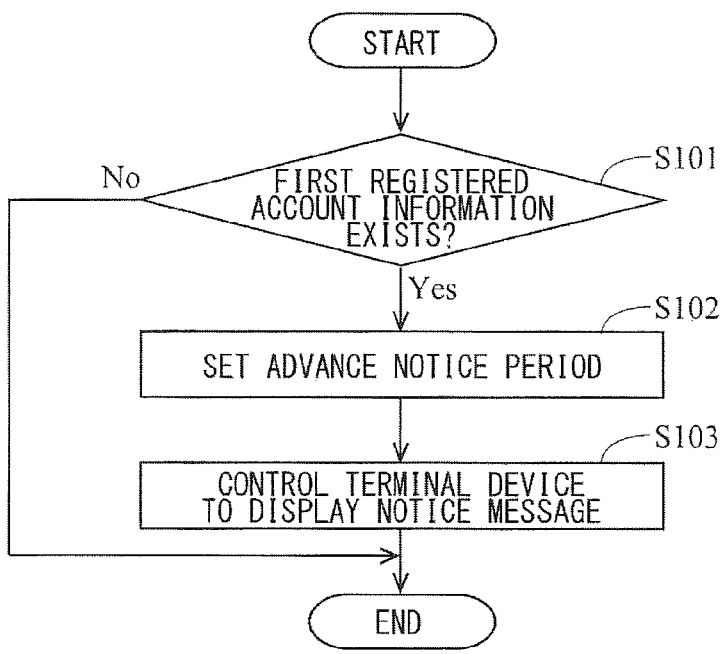
FIG. 10 is a flowchart for explaining a process for setting an advance notice period performed by the management server according to an embodiment of the present invention.

First, it is supposed that the management server 100 stores the registered account information when the flowchart illustrated in FIG. 10 is started. Further, when a predetermined time point comes after the present date is changed, the flowchart illustrated in FIG. 10 is started.

In Step S101, the management control unit 110 determines whether or not there is registered account information having the end date of the valid period in a predetermined first period from the present date (hereinafter may be referred to as first registered account information). Note that the first period can be arbitrarily set. For instance, the first period is a few days (approximately two days). As a result of the determination, if there is the first registered account information, the process proceeds to Step S102. If there is not the first registered account information, this flow is finished.

Figure 11:
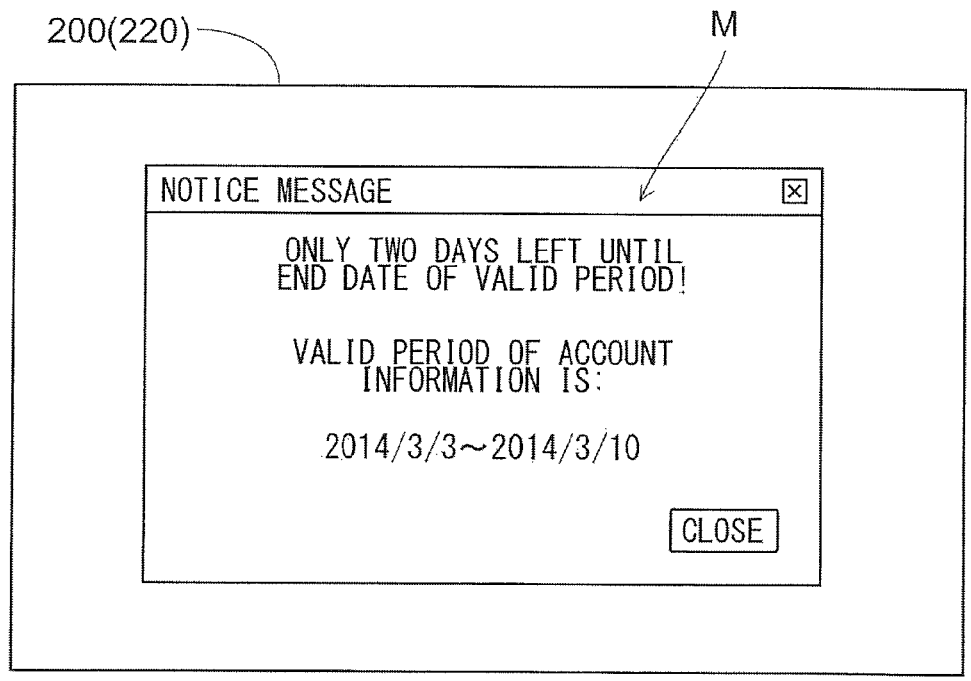
FIG. 11 is a diagram illustrating an example of a notice message displayed on the terminal device that has received a command from the management server according to an embodiment of the present invention.

When the process proceeds to Step S102, the management control unit 110 sets the period from the present date to the end date of the valid period of the first registered account information as the advance notice period. Further, in Step S103, the management control unit 110 instructs the management communication unit 140 to transmit the advance notice period to the terminal device 200 that is used by the registered user of the first registered account information. In this way, the management control unit 110 controls the terminal device 200 (terminal display unit 220) to display a notice message M as illustrated in FIG. 11 in the advance notice period.

In this case, the terminal device 200 (terminal display unit 220) displays the notice message M, which is a message for the registered user to recognize the end date of the valid period of the first registered account information. For instance, a message indicating the valid period of the registered account information, the number of days until the end date of the valid period, or the like is displayed as the notice message M. Note that if the present date is the end date of the valid period, the number of days until the end date of the valid period is zero. In addition, the notice message M is displayed in a pop-up manner as a dialog box.

By this notification, the registered user can recognize the end date of the valid period of the first registered account information. For instance, when the registered user wants to postpone the end date of the valid period of the first registered account information, the registered user transmits the job data including the same account information as the first registered account information to the management server 100. Alternatively, the registered user logs in the multifunction peripheral 300 so that the multifunction peripheral 300 in the logged-in state can execute a certain job. In this way, the start date (end date) of the valid period of the first registered account information is reset.

Hereinafter, the registered account information of the user A illustrated in FIG. 8 (see record 3) is exemplified for specific description. Further, in the following description, it is supposed that the first period is set to two days as an example.

Figure 12:
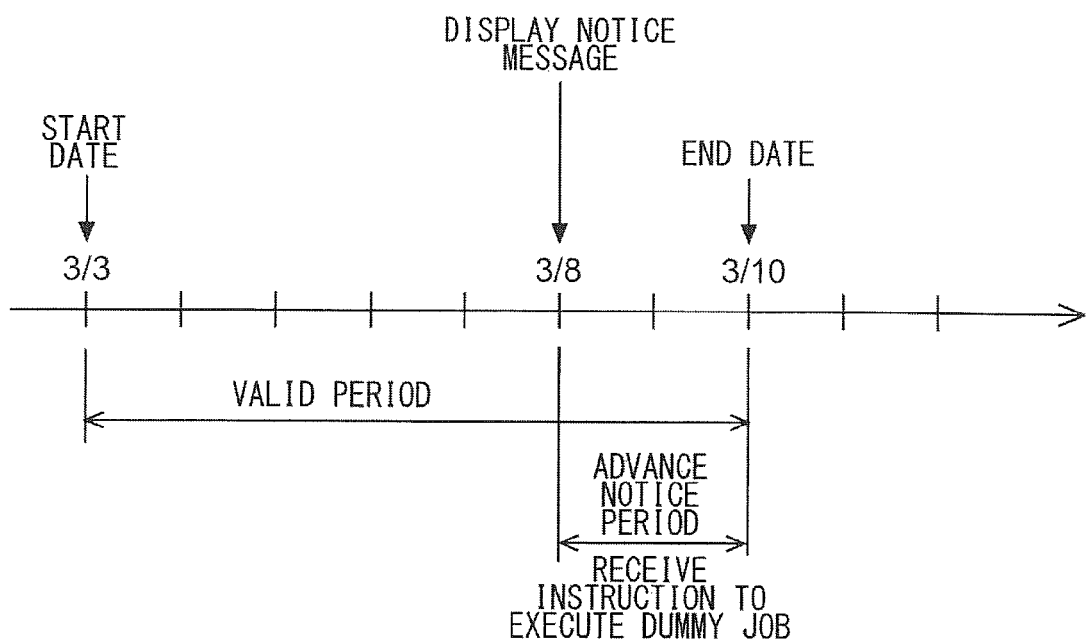
FIG. 12 is a diagram illustrating the start date and the end date of the advance notice period set by the management server according to an embodiment of the present invention.

The end date of the valid period of the registered account information of the user A is March 10. Accordingly, when the present date becomes March 8, the end date of the valid period of the registered account information of the user A comes two days later. Accordingly, as illustrated in FIG. 12, when a predetermined time point on March 8 comes, the management control unit 110 controls the terminal device 200 of the user A to display the notice message M (see FIG. 11). Further, if the job of the user A has not been executed by the multifunction peripheral 300 at the time point on March 8, the management control unit 110 controls the terminal device 200 of the user A to display the notice message M also on March 9. Further, if the job of the user A has not been executed by the multifunction peripheral 300 at the time point on March 9, the management control unit 110 controls the terminal device 200 of the user A to display the notice message M also on March 10.

Note that the process illustrated in FIG. 10 may not be performed.

(Extension Period)

Hereinafter, with reference to the flowchart illustrated in FIG. 13, a process flow of setting the extension period is described.

Figure 13:
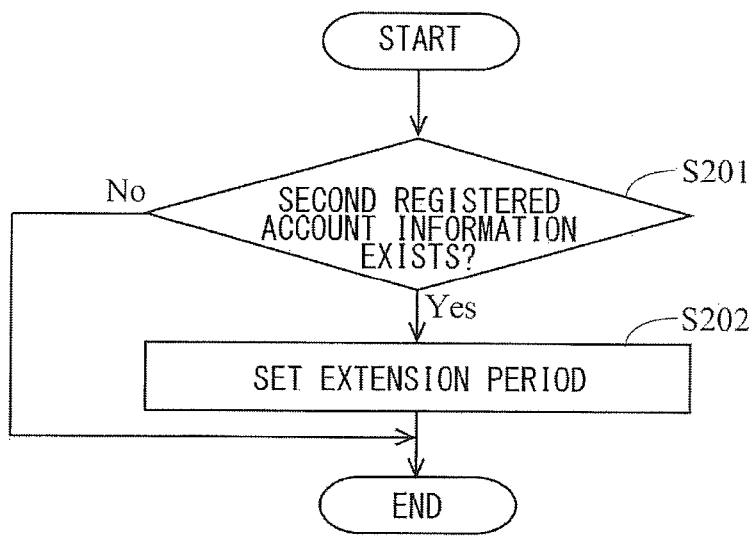
FIG. 13 is a flowchart for explaining a process for setting an extension period performed by the management server according to an embodiment of the present invention.

First, it is supposed that the management server 100 stores the registered account information when the flowchart illustrated in FIG. 13 is started. Further, when a predetermined time point comes before the present date is changed (e.g., a few minutes to a few hours before), the flowchart illustrated in FIG. 13 is started.

In Step S201, the management control unit 110 determines whether or not there is registered account information in which the present date is the end date of the valid period (hereinafter may be referred to as second registered account information). As a result of the determination, if there is the second registered account information, the process proceeds to Step S202. If there is not the second registered account information, this flow is finished.

When the process proceeds to Step S202, the management control unit 110 sets the period from the end date of the valid period of the second registered account information to the date after a predetermined second period as the extension period. Note that the second period can be arbitrarily set. For instance, the second period is a few days (approximately two days).

When the extension period is set in this way, the management control unit 110 regards the second registered account information as valid until the extension period is passed and does not delete the second registered account information (when the extension period is passed, the second registered account information is deleted). In other words, the end date of the valid period of the second registered account information is postponed to the end date of the extension period.

Hereinafter, the registered account information of the user A illustrated in FIG. 8 (see record 3) is exemplified for specific description. Further, in the following description, it is supposed that the second period is set to two days as an example.

Figure 14:
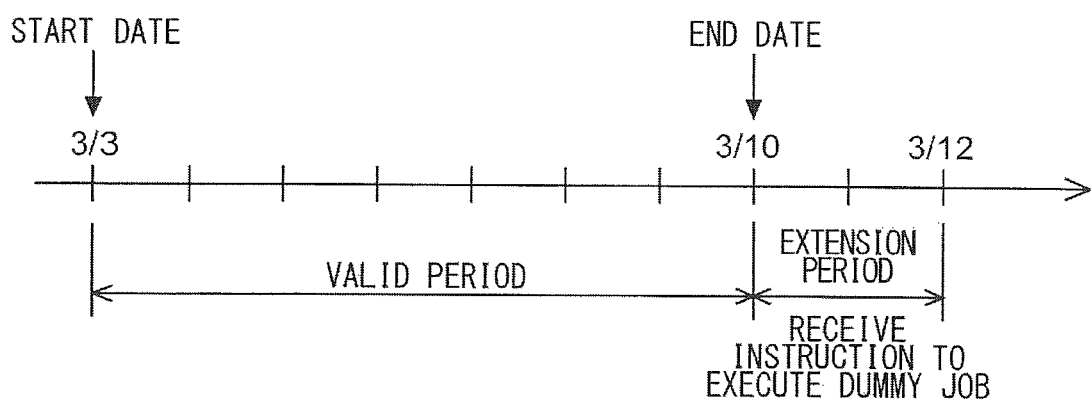
FIG. 14 is a diagram illustrating the start date and the end date of the extension period set by the management server according to an embodiment of the present invention.

The end date of the valid period of the registered account information of the user A is March 10. In this way, as illustrated in FIG. 14, when a predetermined time point on March 10 comes, the management control unit 110 sets the extension period with the date as the start date. Here, two days after the end date of the valid period of the registered account information of the user A is March 12. Accordingly, the extension period is until March 12.

Note that the process illustrated in FIG. 13 may not be performed. In addition, both the process illustrated in FIG. 10 and the process illustrated in FIG. 13 may be performed.

(Dummy Job)

Hereinafter, with reference to the flowchart illustrated in FIG. 15, a process flow when the multifunction peripheral 300 receives an instruction to execute a dummy job is described.

Figure 15:
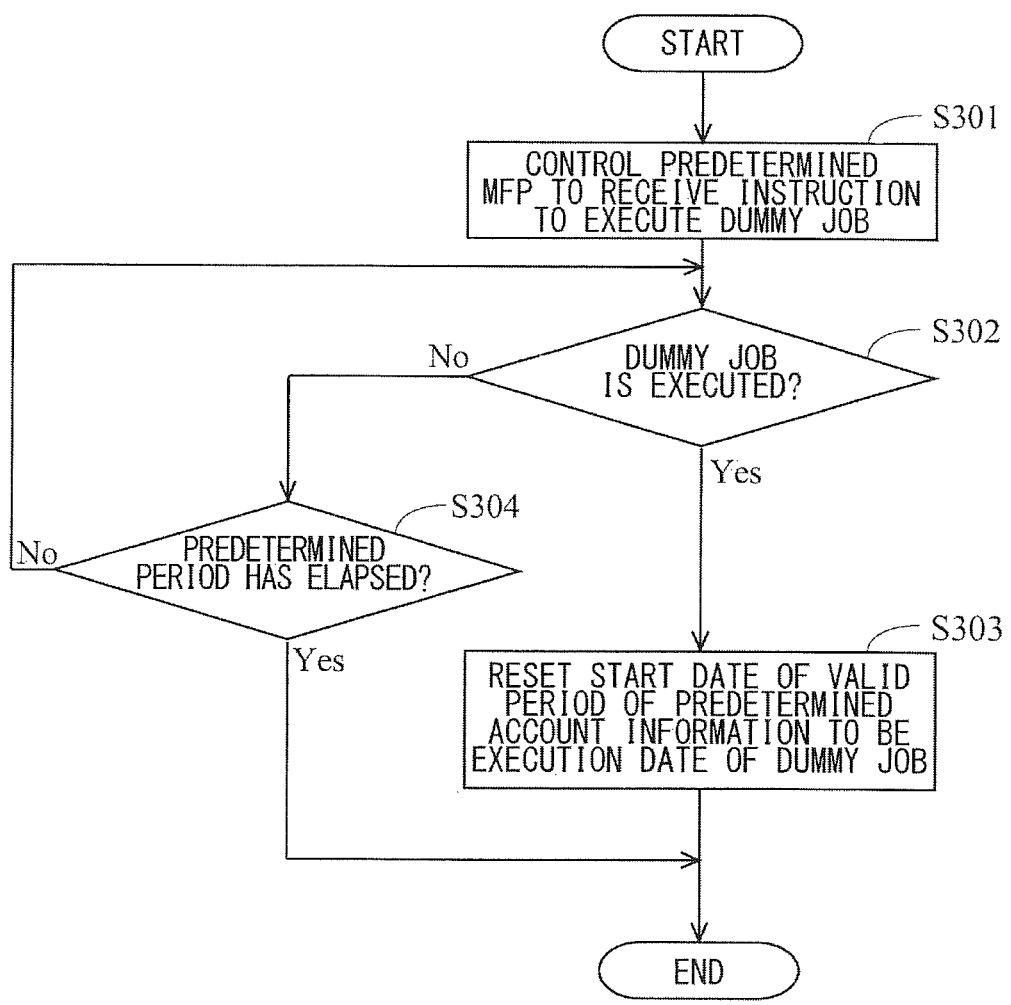
FIG. 15 is a flowchart for explaining a process for resetting the start date and the end date of the valid period of the account information on the basis of a dummy job execution date performed by the management server according to an embodiment of the present invention.

First, the flowchart illustrated in FIG. 15 starts when one of the multifunction peripherals 300 in the image forming system S receives the input of the same account information as the first registered account information to be the logged-in state in the period from start to end of the advance notice period. Alternatively, the flowchart illustrated in FIG. 15 starts when one of the multifunction peripherals 300 in the image forming system S receives the input of the same account information as the second registered account information to be the logged-in state in the period from start to end of the extension period.

Note that in the following description, for convenience sake, the advance notice period as well as the extension period is referred to as a predetermined period. In addition, the first registered account information as well as the second registered account information is referred to as predetermined account information. Further, the multifunction peripheral 300 in the logged-in state after receiving the input of the same account information as the predetermined account information is referred to as the predetermined multifunction peripheral 300.

Figure 16:
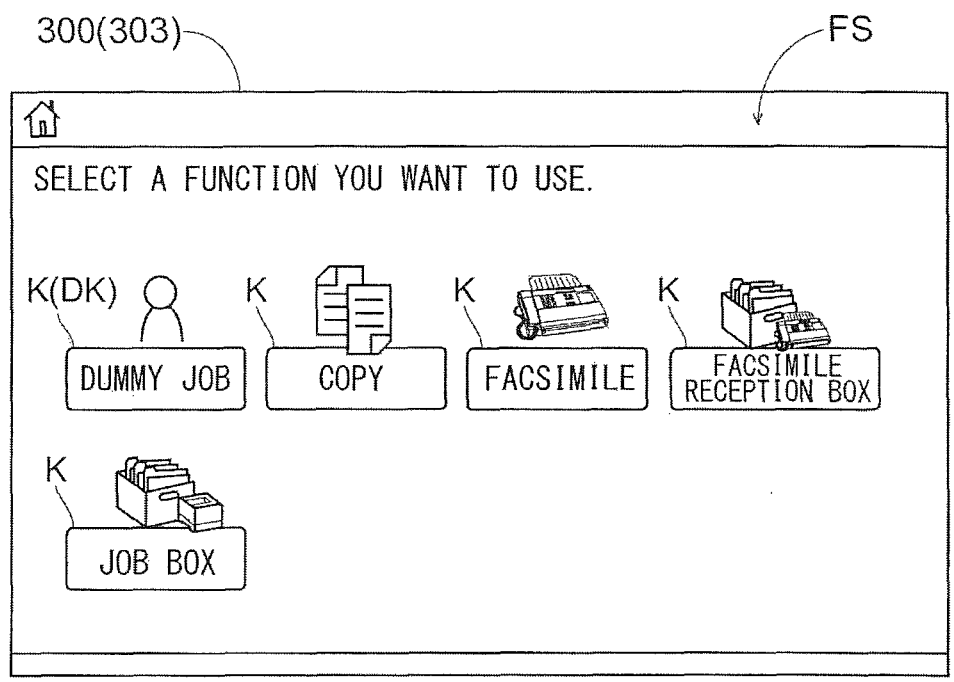
FIG. 16 is a diagram illustrating an example of a function selection screen displayed on the multifunction peripheral that has received a command from the management server according to an embodiment of the present invention (a screen for receiving a command to execute the dummy job).

In Step S301, the management control unit 110 instructs the management communication unit 140 to transmit a command to the predetermined multifunction peripheral 300 in the logged-in state so as to control the predetermined multifunction peripheral 300 to receive an instruction to execute the dummy job. When receiving this command, the predetermined multifunction peripheral 300 (operation panel 303) in the logged-in state displays a function selection screen FS as illustrated in FIG. 16 for receiving the instruction to execute the dummy job.

The function selection screen FS is a screen for receiving a selection instruction of a function to be used among the plurality of functions (such as the copy function and the facsimile function) of the predetermined multifunction peripheral 300. A plurality of software keys K corresponding respectively to the plurality of functions are arranged in the function selection screen FS. In addition, in this function selection screen FS, there is further arranged a dummy job key DK for receiving the instruction to execute the dummy job. In other words, the function selection screen FS is a screen for receiving the instruction to execute the dummy job.

When receiving a touch operation of the dummy job key DK, the predetermined multifunction peripheral 300 in the logged-in state executes the dummy job. Note that the dummy job is a job of transmitting a blank e-mail to the management server 100. However, the dummy job is not limited to the job of transmitting a blank e-mail. For instance, a job without printing an image on a paper sheet is set as the dummy job. In addition, when executing the dummy job, an operation of setting a set value (e.g., an operation of inputting an address) is not required, and the job is executed only by a touch operation of the dummy job key DK.

With reference to FIG. 15 again, when the predetermined multifunction peripheral 300 in the logged-in state starts to receive the instruction to execute the dummy job, the process proceeds to Step S302. In Step S302, the management control unit 110 determines whether or not the predetermined multifunction peripheral 300 in the logged-in state has executed the dummy job. As a result of the determination, if the dummy job has been executed, the process proceeds to Step S303. If the dummy job has not been executed, the process proceeds to Step S304.

When proceeding to Step S303, the management control unit 110 resets the start date of the valid period of the predetermined account information to be the execution date of the dummyjob. In other words, in the advance notice period, the start date of the valid period of the first registered account information is reset to be the execution date of the dummyjob. In the extension period, the start date of the valid period of the second registered account information is reset to be the execution date of the dummy job. In other words, the dummy job key DK (see FIG. 16) is a key for resetting the start date (end date) of the valid period of the registered account information.

When proceeding to Step S304, the management control unit 110 determines whether or not the predetermined period has elapsed. As a result of the determination, if the predetermined period has elapsed, this flow is finished. If the predetermined period has not elapsed, the process returns to Step S302. In other words, when entering the advance notice period, as illustrated in FIG. 12, the instruction to execute the dummy job is received in the valid period. When entering the extension period, as illustrated in FIG. 14, the instruction to execute the dummy job is received in the extension period.

The management server 100 included in the image forming system S of this embodiment includes the management communication unit 140 (communication unit), which receives from the terminal device 200 the job data generated by the terminal device 200 on the basis of the installed printer driver PD (driver software) and transfers the job data to the multifunction peripheral 300 (image forming apparatus) so that the multifunction peripheral 300 executes the job based on the job data, and the management control unit 110 (registering unit), which registers the account information of the user who uses the multifunction peripheral 300. Further, when the management communication unit 140 receives the registering job data (including the account information), the management control unit 110 determines whether or not the account information contained in the registering job data satisfies the predetermined registration condition. If it is determined that the account information contained in the registering job data satisfies the registration condition, the account information contained in the registering job data is registered. If it is determined that the account information contained in the registering job data does not satisfy the registration condition, the account information contained in the registering job data is not registered.

In the structure of this embodiment, when the management communication unit 140 receives the registering job data, if the account information contained in the registering job data satisfies the registration condition, the account information is registered by the management control unit 110. In this way, for registration of the account information, manual input of the account information is not necessary (registration of the account information is simplified). As a result, a load on the account manager in charge of registering the account information can be reduced.

In addition, in this embodiment, as described above, when the management communication unit 140 receives the registering job data, if the position information indicating the location of the terminal device 200 is contained in the job data, and if the location of the terminal device 200 is within the predetermined position range, the management control unit 110 determines that the account information contained in the job data satisfies the registration condition and registers the account information contained in the job data. On the other hand, if the job data does not contain the position information, or if the location of the terminal device 200 is outside the predetermined position range even if the job data contains the position information, the management control unit 110 determines that the account information contained in the job data does not satisfy the registration condition and does not register the account information contained in the job data. With this structure, by setting the position range in advance so as to include only the location of the terminal device 200 that is used by the user whose account information is allowed to be registered, it is possible to suppress registration of the account information by the user whose account information is not allowed to be registered.

In addition, in this embodiment, as described above, when the management communication unit 140 receives the job data containing the account information and the position information, if the location of the terminal device 200 is within the predetermined position range, and if the position information is set in the predetermined registration receiving period, the management control unit 110 determines that the account information contained in the job data satisfies the registration condition and registers the account information contained in the job data. On the other hand, if the job data does not contain the date and time information indicating the date and time when the position information is set, or if the position information is set outside the predetermined registration receiving period even if the job data contains the date and time information, the management control unit 110 determines that the account information contained in the job data does not satisfy the registration condition and does not register the account information contained in the job data. With this structure, by notifying the registration receiving period in advance only to the user whose account information is allowed to be registered, it is possible to suppress registration of the account information by the user whose account information is not allowed to be registered.

In addition, in this embodiment, as described above, the management control unit 110 instructs the management communication unit 140 to transmit the password to the terminal device 200 in advance. Further, when the management communication unit 140 receives the job data containing the account information, if the same password as that transmitted to the terminal device 200 in advance is contained in the job data, the management control unit 110 determines that the account information contained in the job data satisfies the registration condition and registers the account information contained in the job data. On the other hand, if the same password as that transmitted to the terminal device 200 in advance is not contained in the job data, the management control unit 110 determines that the account information contained in the job data does not satisfy the registration condition and does not register the account information contained in the job data. With this structure, by transmitting the password in advance only to the terminal device 200 that is used by the user whose account information is allowed to be registered, it is possible to suppress registration of the account information by the user whose account information is not allowed to be registered.

In addition, in this embodiment, as described above, the management control unit 110 instructs the management communication unit 140 to transmit to the terminal device 200 in advance the certificate generation information for the terminal device 200 to generate the electronic certificate. Further, when the management communication unit 140 receives the job data containing the account information, if the job data contains the electronic certificate, and if the electronic certificate is valid, the management control unit 110 determines that the account information contained in the job data satisfies the registration condition and registers the account information contained in the job data. On the other hand, if the job data does not contain the electronic certificate, or if the electronic certificate is not valid even if the job data contains the electronic certificate, the management control unit 110 determines that the account information contained in the job data does not satisfy the registration condition and does not register the account information contained in the job data. With this structure, by transmitting the certificate generation information in advance only to the terminal device 200 that is used by the user whose account information is allowed to be registered, it is possible to suppress registration of the account information by the user whose account information is not allowed to be registered.

In addition, in this embodiment, as described above, when the management operation unit 130 receives an instruction to output the job execution history (information containing the registered account information), the management control unit 110 instructs the management communication unit 140 to transmit to the multifunction peripheral 300 the job data for outputting the job execution history. In other words, the management control unit 110 controls the multifunction peripheral 300 to output the job execution history. With this structure, it is possible to easily check the registered account information (the user who has registered the account information).

In addition, in this embodiment, the job data containing the account information is job data for the multifunction peripheral 300 to execute the print job (printer job). With this structure, when the multifunction peripheral 300 executes the print job (printer job), registration of the account information can be performed.

In addition, in this embodiment, as described above, the management storage unit 150 stores the predetermined valid period as a period while the account information can be used. Further, the management control unit 110 sets the start date and the end date of the valid period of the registered account information so that the start date of the valid period of the registered account information becomes the registration date of the registered account information. In this way, it is not necessary to set the start date and the end date of the valid period of the registered account information, and hence the load on the account manager can be reduced more.

In addition, in this embodiment, as described above, when receiving the predetermined job data containing the same account information as the registered account information, the management communication unit 140 transmits the predetermined job data to the multifunction peripheral 300 so as to allow the multifunction peripheral 300 to execute the job based on the predetermined job data. Further, when the job based on the predetermined job data is executed by the multifunction peripheral 300, the management control unit 110 resets the start date of the valid period of the registered account information corresponding to the account information contained in the predetermined job data to be the execution date of the job based on the predetermined job data. With this structure, only by transmitting the predetermined job data to the management server 100, the valid period of the registered account information is extended, and hence convenience of the registered user of the registered account information is improved. In addition, convenience of the account manager is also improved because resetting work of the start date (end date) of the registered account information can be eliminated.

In addition, in this embodiment, as described above, when the job is executed by the multifunction peripheral 300 in the logged-in state after receiving the input of the same account information as the registered account information, the management control unit 110 resets the start date of the valid period of the registered account information corresponding to the account information input to the multifunction peripheral 300 in the logged-in state to be the execution date of the job. With this structure, only by logging in the multifunction peripheral 300 so that the multifunction peripheral 300 in the logged-in state executes the job, the valid period of the registered account information is extended, and hence convenience of the registered user of the registered account information is improved. In addition, convenience of the account manager is also improved because resetting work of the start date (end date) of the registered account information can be eliminated.

In addition, in this embodiment, as described above, if there is the first registered account information in which the end date of the valid period comes in the first period from the present date, the management control unit 110 sets the period from the present date to the end date of the valid period of the first registered account information as the advance notice period. In addition, the management communication unit 140 transmits the advance notice period to the terminal device 200 that is used by the registered user of the first registered account information so that the terminal device 200 makes notification for the registered user of the first registered account information to recognize the end date of the valid period of the first registered account information in the advance notice period. With this structure, the registered user can recognize that the end date of the valid period of the first registered account information is coming soon, and hence convenience of the registered user of the first registered account information is improved.

In addition, in this embodiment, as described above, if there is the second registered account information in which the present date is the end date of the valid period, the management control unit 110 sets the second period from the end date of the valid period of the second registered account information as the extension period and regards the second registered account information as valid until the extension period is passed (does not delete the second registered account information). By setting this extension period, convenience of the registered user of the second registered account information is improved.

In addition, in this embodiment, as described above, when the multifunction peripheral 300 that has received the input of the same account information as the first registered account information (or the second registered account information) becomes the logged-in state during the period until the advance notice period (or the extension period) elapses, the management communication unit 140 transmits the command to the multifunction peripheral 300 in the logged-in state so that the multifunction peripheral 300 receives the instruction to execute the dummy job. Further, when the multifunction peripheral 300 in the logged-in state executes the dummy job, the management control unit 110 resets the start date of the valid period of the first registered account information (or the second registered account information) to be the execution date of the dummy job. With this structure, the valid period of the registered account information can be extended without executing the printer job or the copy job by the multifunction peripheral 300 (without wasting paper sheets.

The embodiments disclosed above are merely examples in every aspect and should not be interpreted as limitations. The scope of the present disclosure is defined not by the above description of the embodiments but by the claims, and includes all modifications within the meanings and range equivalent to the claims.

What is claimed is:

What is claimed is:

1. A management server comprising:
a communication unit configured to receive job data from a terminal device, the job data generated by the terminal device on the basis of installed driver software, and to transmit the job data to an image forming apparatus, so as to cause the image forming apparatus to perform a job based on the job data;
a registering unit configured to register account information of a user who uses the image forming apparatus; and
a receiving unit configured to receive a setting operation, wherein
the account information includes a user ID and a first password,
when the communication unit receives the job data containing the account information input to the terminal device, the registering unit determines whether or not the account information contained in the job data satisfies a predetermined registration condition, and if a position information indicating a location of the terminal device set by the terminal device is contained in the job data and if the location is within a position range in which the receiving unit has received the setting in advance, the registering unit determines that the account information contained in the job data satisfies the registration condition and registers the account information contained in the job data, and if the job data does not contain the position information or if the location is outside the position range even if the job data contains the position information, the registering unit determines that the account information contained in the job data does not satisfy the registration condition and does not register the account information contained in the job data.

2. The management server according to claim 1, wherein when the communication unit receives the job data containing the account information and the position information, if the location is within the position range and if the position information is set within a registration receiving period in which the receiving unit has received the setting in advance, the registering unit determines that the account information contained in the job data satisfies the registration condition and registers the account information contained in the job data, while if the job data does not contain date and time information indicating the date and time when the position information is set, or if the position information is set outside the registration receiving period even if the job data contains the date and time information, the registering unit determines that the account information contained in the job data does not satisfy the registration condition and does not register the account information contained in the job data.

3. A management server comprising:
a communication unit configured to receive job data from a terminal device, the job data generated by the terminal device on the basis of installed driver software, and to transmit the job data to an image forming apparatus, so as to cause the image forming apparatus to perform a job based on the job data; and
a registering unit configured to register account information of a user who uses the image forming apparatus, wherein
the account information includes a user ID and a first password,
the communication unit transmits a second password to the terminal device in advance, and
when the communication unit receives the job data containing the account information input to the terminal device, the registering unit determines whether or not the account information contained in the job data satisfies a predetermined registration condition, and if the same password as the second password transmitted to the terminal device in advance is contained in the job data, the registering unit determines that the account information contained in the job data satisfies the registration condition and registers the account information contained in the job data, while if the same password as the second password transmitted to the terminal device in advance is not contained in the job data, the registering unit determines that the account information contained in the job data does not satisfy the registration condition and does not register the account information contained in the job data.

4. The management server according to claim 3, wherein the second password is a password in which a valid time limit is set, and when the communication unit receives the job data containing the account information, if the same password as the second password transmitted to the terminal device in advance is contained in the job data and if the valid time limit of the second password is not passed, the registering unit determines that the account information contained in the job data satisfies the registration condition and registers the account information contained in the job data, while if the valid time limit of the second password is passed even if the same password as the second password transmitted to the terminal device in advance is contained in the job data, the registering unit determines that the account information contained in the job data does not satisfy the registration condition and does not register the account information contained in the job data.

5. A management server comprising:

a communication unit configured to receive job data from a terminal device, the job data generated by the terminal device on the basis of installed driver software, and to transmit the job data to an image forming apparatus, so as to cause the image forming apparatus to perform a job based on the job data; and a registering unit configured to register account information of a user who uses the image forming apparatus, wherein the account information includes a user ID and a first password, the communication unit transmits to the terminal device in advance certificate generation information for the terminal device to generate an electronic certificate, and when the communication unit receives the job data containing the account information input to the terminal device, the registering unit determines whether or not the account information contained in the job data satisfies a predetermined registration condition, and if the job data contains the electronic certificate and if the electronic certificate is valid, the registering unit determines that the account information contained in the job data satisfies the registration condition and registers the account information contained in the job data, while if the job data does not contain the electronic certificate or if the electronic certificate is not valid even if the job data contains the electronic certificate, the registering unit determines that the account information contained in the job data does not satisfy the registration condition and does not register the account information contained in the job data.

6. The management server according to claim 1, wherein the receiving unit receives an instruction to output information containing the registered account information, and when the receiving unit receives the output instruction, the communication unit transmits job data for outputting the information containing the registered account information to the image forming apparatus so that the image forming apparatus outputs the information containing the registered account information.

7. The management server according to claim 1, wherein the image forming apparatus is an image forming apparatus capable of executing a print job of printing an image on a paper sheet, and the job data is a job data for the image forming apparatus to execute the print job.

8. The management server according to claim 1, further comprising a storage unit for storing a predetermined valid period as a period in which the account information can be used, wherein the registering unit sets a start date and an end date of the valid period of the registered account information so that the start date of the valid period of the registered account information becomes a registration date of the registered account information.

9. The management server according to claim 8, wherein when receiving a predetermined job data that is the job data containing the same account information as the registered account information, the communication unit transmits the predetermined job data to the image forming apparatus so as to cause the image forming apparatus to execute a job based on the predetermined job data, and when the job based on the predetermined job data is executed by the image forming apparatus, the registering unit resets the start date and the end date of the valid period of the registered account information so that the start date of the valid period of the registered account information corresponding to the account information contained in the predetermined job data becomes an execution date of the job based on the predetermined job data.

10. The management server according to claim 8, wherein when the job is executed by the image forming apparatus in a logged-in state after receiving an input of the same account information as the registered account information, the registering unit resets the start date and the end date of the valid period of the registered account information so that the start date of the valid period of the registered account information corresponding to the account information input to the image forming apparatus in the logged-in state becomes an execution date of the job.

11. The management server according to claim 8, wherein when there is first registered account information that is the registered account information whose end date of the valid period comes in a predetermined first period from the present date, the registering unit sets a period from the present date until the end date of the valid period of the first registered account information as an advance notice period, and the communication unit transmits the advance notice period to the terminal device that is used by a registered user of the first registered account information, so that the terminal device makes notification for the registered user of the first registered account information to recognize the end date of the valid period of the first registered account information in the advance notice period.

12. The management server according to claim 11, wherein when the image forming apparatus that has received an input of the same account information as the first registered account information becomes the logged-in state before the advance notice period elapses, the communication unit transmits a command to the image forming apparatus in the logged-in state so that the image forming apparatus receives an instruction to execute the dummy job, and when the image forming apparatus in the logged-in state executes the dummy job, the registering unit resets the start date and the end date of the valid period of the first registered account information so that the first start date of the valid period of the first registered account information becomes an execution date of the dummy job.

13. The management server according to claim 8, wherein if there is a second registered account information that is the registered account information in which the present date is the end date of the valid period, the registering unit sets a predetermined second period from the end date of the valid period of the second registered account information as an extension period, and the second registered account information is regarded as valid until the extension period elapses.

14. The management server according to claim 13, wherein when the image forming apparatus that has received an input of the same account information as the second registered account information becomes the logged-in state before the extension period elapses, the communication unit transmits a command to the image forming apparatus in the logged-in state so that the image forming apparatus receives an instruction to execute the dummy job, and when the image forming apparatus in the logged-in state executes the dummy job, the registering unit resets the start date and the end date of the valid period of the second registered account information so that the start date of the valid period of the second registered account information becomes an execution date of the dummy job.

15. The management server according to claim 8, wherein the account information contains type information indicating a type of the user, the valid period stored in the storage unit is determined for each user, and the registering unit discriminates the valid period corresponding to the type information contained in the registered account information and sets the discriminated valid period as the valid period of the registered account information.

16. An image forming system comprising:
the management server according to claim 1;
an image forming apparatus connected to the management server in a communicable manner; and
a terminal device configured to transmit job data for causing the image forming apparatus to perform a job to the management server.

* * * * *